Patented Feb. 19, 1929.

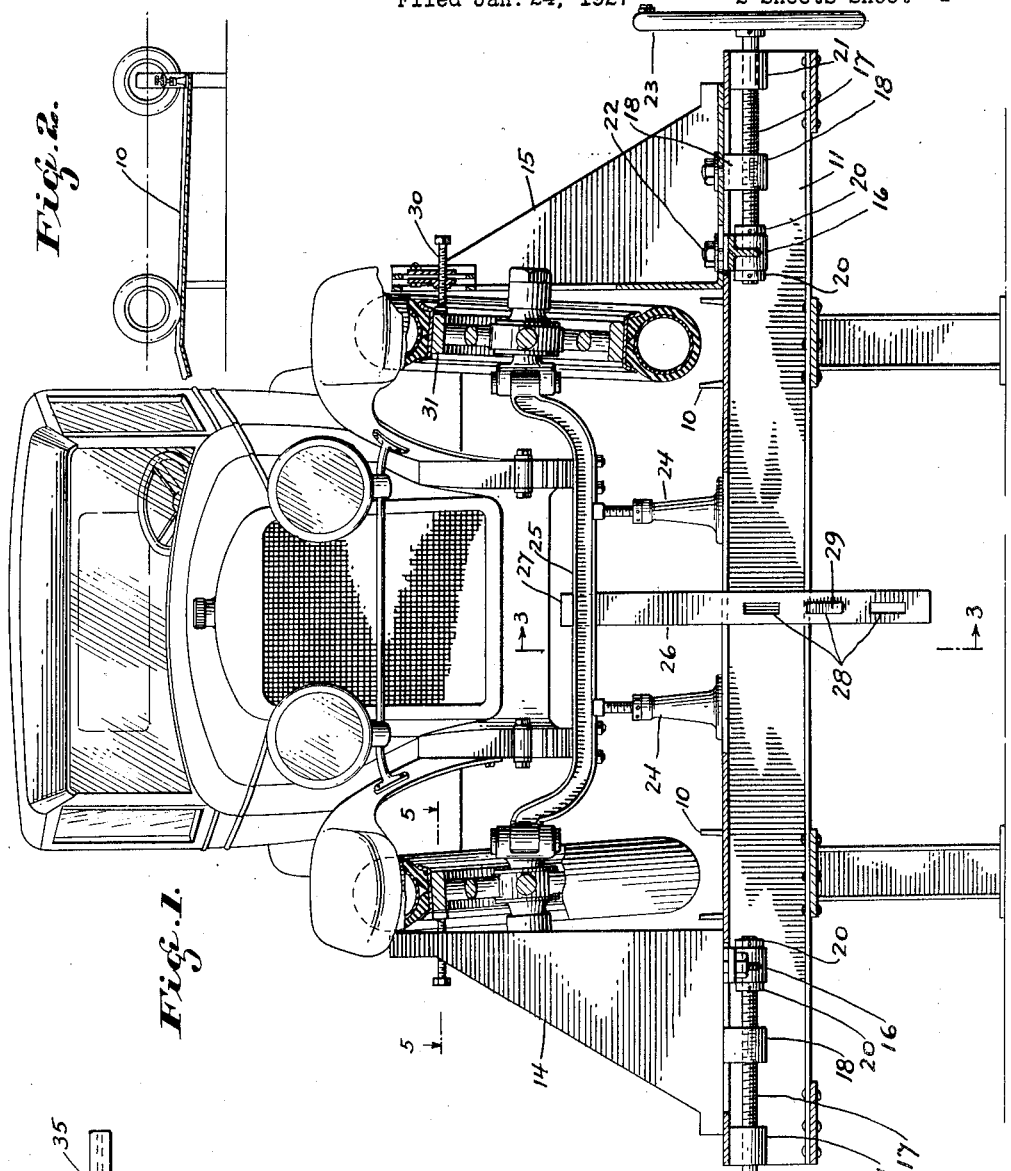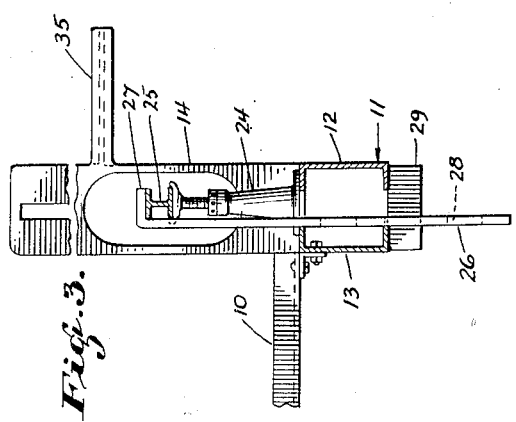

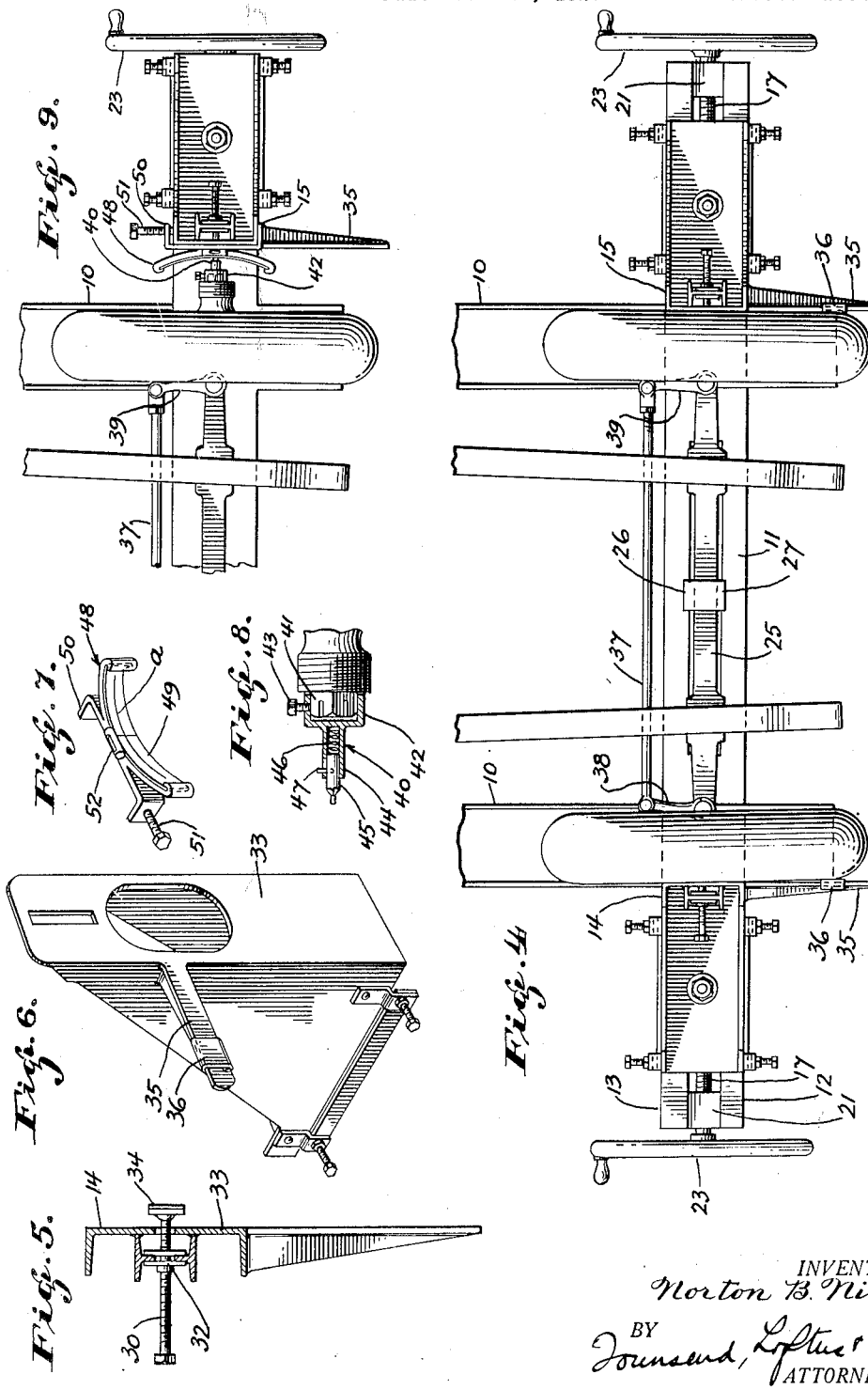

1,702,794

UNITED STATES PATENT OFFICE.

NORTON B. NICHOLS, OF SAN FRANCISCO, CALIFORNIA.

WHEEL-ALIGNING DEVICE.

Application filed January 24, 1927. Serial No. 163,076.

This invention relates to a wheel aligning device and particularly pertains to a fixture adapted to be used on automobiles to determine the aligned condition of the front wheels of the automobile.

It is common practice in the designing of automobiles to construct the front axle of the automobile and its wheels in a manner to bring about "camber", "toe-in" and "caster" effects in the wheels of the axle. As is well known to automobile designers and mechanics, the presence of these effects in a front axle construction makes it possible to more readily steer the vehicle and it is also well known that continued driving of the vehicle over irregular and rough roadways will tend to remove the "camber", "toe-in" and "caster" characteristics of the axle.

It is the principal object of the present invention to provide means by which the axle may be readily tested and the wheels accurately set to produce a desired amount of "camber", "toe-in" and "caster" effect therein.

The present invention contemplates the use of a fixture upon which an automobile may be driven and thereafter set, and which fixture is so constructed as to make it possible to readily measure and determine the amount of "camber", "caster" and "toe-in" in the wheel assembly or setting.

The invention is illustrated by way of example in the accompanying drawing, in which:

Figure 1 is a view in front elevation showing the complete wheel aligning device with an automobile applied thereto, and further showing parts of the automobile broken away to more clearly illustrate the manner in which the "camber" effect is tested.

Figure 2 is a view drawn on a reduced scale and showing the manner in which the automobile may be run on to the fixture.

Figure 3 is a view in transverse section as seen on the line 3—3 of Figure 1, and with the vehicle removed from the aligning device.

Figure 4 is a fragmentary view and plan showing the front portion of the vehicle mounted upon the aligning device and particularly showing the "toe-in" gauges.

Figure 5 is a view in horizontal section through the "camber" gauge as taken on the line 5—5 of Figure 1.

Figure 6 is a view in perspective showing one of the gauge uprights and particularly disclosing the portion of the "toe-in" gauge arm thereon.

Figure 7 is a view in perspective showing the "caster" gauge adapted to be posted upon the gauge upright.

Figure 8 is a view in central section and elevation showing the "caster" marking member as applied to the hub of the automobile wheel.

Figure 9 is a fragmentary view in plan showing the manner in which the "caster" gauge is operated.

Referring more particularly to the drawing, it will be seen that the aligning device comprises a pair of parallel track-ways, 10. These track-ways 10 may be formed with a substantially horizontally extending portion 10' and incline portion 10", upon the latter of which the automobile is driven up onto the aligning device (see Fig. 2). The substantially horizontal portion 10' of the trackways is slightly inclined toward the front of the device so that when the front axle 25 is jacked up during the testing operation the vehicle will be supported in its normal horizontal aligned position. A transverse frame member, 11, secures the track ways, 10, in spaced parallel alignment at their forward ends. This frame member is here shown in the form of a box girder comprising two channel beams, 12 and 13. These channel beams serve as ways for gauge supports, 14 and 15, which supports may move laterally of the track ways, and may be moved toward and away from the sides of an automobile adapted to be disposed upon the trackways. Secured to the channel members 12 and 13 of the transverse beam 11 are bearings, 16. These bearings receive operating screws 17, by which the gauge uprights 14 and 15 may be moved. Thrust collars, 20, are pinned to the screws 17 upon opposite sides of the bearings 16, and prevent longitudinal movement of the operating screws. These screws pass through threaded nuts, 18, one of which is secured beneath each of the gauge uprights, 14 or 15, and by which the upright may be shifted laterally of the device. A guide collar, 21, is secured to the beam 11 adjacent its ends and forms a free guide for the operating screws, 17. In order to prevent the gauge uprights, 14 and 15, from tilting under undue strains, cap screws, 22, extend down through slotted openings in the bed portion of these gauge members and engage the bearing structure 16, thus permitting the uprights to slide without allowing them to tilt. Hand wheels, 23, are secured one upon the outer end of each of the operating screws 17.

As previously stated, the present invention is designed to make it possible to detect and determine the amount of "camber," "toe-in" and "caster" in the wheels of an automobile. By "camber" is meant the amount of deviation from the vertical by the front wheels of an automobile, and which deviation will cause the portion of the wheels in contact with the ground to be closer together than a similar point on the wheel at any point above the ground. By "toe-in" is meant the amount of deviation from the horizontal due to the fact that the wheels are turned inwardly so that like points on the extreme forward portion of their treads will be closer together than any other like points in the wheel at the same time. By "caster" is meant the amount of deviation from the vertical at which the steering knuckle spindles are disposed to cause the projected axis of the steering knuckles to intersect the ground at a point in advance of the point at which the tread of the wheel will contact with the ground.

In checking and determining the "camber" effect with the present invention, the jacks, 24, are disposed upon the transverse beam 11 and beneath the axle, 25, of the vehicle, at points on opposite sides of the longitudinal center of the vehicle. A bending bar, 26, extends upwardly between the two channel members, 12 and 13, of the transverse beam, 11, and is formed with a hook, 27, overhanging the axle, 25, to engage the same. A plurality of perforations, 28, are formed through the bending bar and at points throughout its length. A stop bar, 29, may be positioned through any one of these perforations as shown in Figure 1 of the drawing so as to accommodate axles having varying road clearance.

When the front axles have been lifted from the runways, 10, gauge screws, 30, are adapted to engage the outer face of the wheel felly, 31, at the uppermost point in its travel. These gauge screws, as more clearly shown in Figure 5 of the drawing, extend through a nut, 32, and through an opening in the face plate, 33, of each of the gauge uprights 14 and 15. A swivel button, 34, is mounted upon the inner end of each of the "camber" gauge screws, 31, said button being provided to contact with the outer vertical face of the wheel felly and to thus make it possible to accurately set the gauges with relation to the wheels. It is then possible to use calipers and to determine the amount of "camber" or inward inclination of the wheels in a vertical plane from the face plate, 33, of the uprights. This is done by calipering between the face plate 33 and the wheel felly 31 at its highest and lowest points, the difference between these dimensions representing the camber. In the event that the "camber" is too great, the jacks, 24, may be elevated to bend the center of the axle, 25, as it is held by the bending bar, 26, or if, on the other hand, the "camber" is too slight, two bending bars, 26, may be provided and placed in the positions indicated in Figure 1 as being occupied by the jacks, 24, while one jack may be used and placed between the bending bars in the position indicated by the bending bar, 26, thus allowing pressure to be made to deflect the axle in the opposite direction and to thus "camber" the wheels.

When it is desired to test and set the wheels for "toe-in" the structure, as shown in Figure 4, where it will be seen that "toe-in" gauge arms, 35, extend forwardly and in a plane substantially in horizontal alignment with the axis of the wheels. Removable gauge member, 36, may be slidably posted upon the arms, 35, and may be slipped between the forward side face of the wheels to determine the amount of "toe-in," it being understood that the wheels have been placed as near as possible with their tires flush against the face, 33, of the gauge uprights and the arm, 35. In the event that it is desired to vary the "toe-in" this may be done by altering the length of the drag link, 37, connecting the steering arms 38 and 39. The amount of "toe-in" may then be readily determined by changing the length of the drag link until a gauge member, 36, of desired thickness may be interposed between the side face of the wheels and the gauge arms, 35.

When the wheels do not have any "caster" effect, their horizontal axis of rotation will swing directly in a horizontal plane, but when there is "caster" effect, the deviation of the axle spindle from the horizontal will cause the wheel to swing in a plane at an angle to the horizontal. This fact has been used in providing a "caster" gauge in the present case. By reference to Figures 7, 8 and 9, it will be seen that a marking device, 40, may be secured upon the spindle nut, 41, of the front axle. This device comprises a cup, 42, adapted to be pushed over the nut, 41, and fastened by set screw, 43. A sleeve, 44, projects from the cup and receives the marking device, 45, which device may be reciprocated within the sleeve it being yieldably resisted by an expansion spring, 46. A pin, 47, limits the outward movement of the marking device. Detachably secured to the vertical face, 33, of each of the uprights is a chart holder, 48. This holder is arcuate in a horizontal section, the arc being substantially that described by a radius emanating from the vertical axis of the steering knuckle. Suitable means are provided to place recording charts, 49, on this arcuate member, and upon which the marking device, 45, may make a record. A U-shaped clamp member, 50, is secured to the back of the arcuate chart support, and is provided with a set screw, 51, by which the chart holder may be detachably secured to the upright. A spirit level, 52, is mounted on the top of the chart holder so that it may be insured that the holder will be in a horizontal position. The wheel may then be swung on its steering knuckle with the marking device, 45, in connection with the chart. If there is no caster effect in the steering knuckle, the line marked on the chart will be straight and in a horizontal plane, but if there is "caster" effect toward the front of the vehicle, which is a normal condition, the line marked on the chart as indicated at "a" in Figure 7 will extend on an incline upwardly from the center as the marking device 45 swings forwardly, a negative "caster" effect on the other hand will cause the line to swing downwardly from the center as the marking device swings forwardly.

It will thus be seen that by the means here disclosed an automobile may be readily checked as to the exact condition of its front axles and may be readily corrected as to any deviation from the normal condition for the particular type of car being tested, all of which may be brought about in a simple and direct manner.

While I have shown the preferred form of my invention as now known to me, it will be understood that various changes might be made in the combination, construction and arrangement of parts by those skilled in the art without departing from the spirit of the invention as claimed.

Having thus described my invention, what I claim and desire to secure by Letters Patent is:

1. A device of the character described, comprising parallel trackways onto which an automobile may be run, a transverse supporting beam disposed between said trackways and holding them in parallel relation to each other, means upon said beam adapted to lift the front axle, gauging means adjacent the wheels thereof adjustably secured to said beam and adapted to indicate a correct setting for the wheels, and means co-operating with said elevating means, whereby the setting of the wheels may be corrected as indicated by said gauging means.

2. A device of the character described, comprising a support for the front axle of an automobile, adapted to permit free movement of the wheels thereon, a pair of relatively movable gauge members carried by the said support, adapted to indicate the setting of the wheels on said axle, and means whereby said axle may be subjected to a bending stress to change the setting of said wheels, while maintaining said gauge members in position to thus permit the setting change of the wheels to be observed during the bending operation.

3. In a device of the character described, the combination of a support for maintaining the front axle and wheels of an automobile elevated, a pair of cooperating gauging heads arranged upon said support adjacent the outside of the elevated wheels from which a correct setting of the wheels may be determined, and means cooperating with said support adapted to exert a bending stress upon the axle of said wheels whereby it can be bent to bring the wheels to a proper setting without disturbing the adjustment of said gauging heads.

4. In a device of the character described for truing up the front axles of automobiles, the combination of a supporting member for elevating the front axle and wheels of an automobile, a pair of oppositely disposed upright gauging members adjustably secured upon said support adjacent and outside of the wheels having corresponding gauging surfaces in fixed relation to each other from which the proper caster, camber and toe-in for the wheels can be determined, and means cooperating with the supporting member adapted to exert a bending stress upon the axle to thereby bend the same and bring the wheels to a proper setting as indicated by said gauging surfaces.

NORTON B. NICHOLS.